United States Patent [19]

Wilmer

[11] 4,034,343
[45] July 5, 1977

[54] OPTICAL CHARACTER RECOGNITION SYSTEM

[75] Inventor: Michael E. Wilmer, Portola Valley, Calif.

[73] Assignee: Xerox Corporation, Stamford, Conn.

[22] Filed: Oct. 1, 1976

[21] Appl. No.: 728,666

[52] U.S. Cl. ............... 340/146.3 MA; 340/146.3 H
[51] Int. Cl.[2] .......................................... G06K 9/12
[58] Field of Search ......... 340/146.3 MA, 146.3 H, 340/146.3 J, 146.3 R

[56] References Cited

UNITED STATES PATENTS

| | | |
|---|---|---|
| 3,496,542 | 2/1970 | Rabinow .................. 340/146.3 MA |
| 3,976,973 | 8/1976 | Martin et al. ............ 340/146.3 MA |
| 3,992,697 | 11/1976 | Knab et al. ............... 340/146.3 MA |

Primary Examiner—Leo H. Boudreau
Attorney, Agent, or Firm—M. J. Colitz; T. J. Anderson; L. Zalman

[57] ABSTRACT

An optical character recognition system for identifying typewritten characters and converting such to standard code for transmission. To achieve recognition of a character, the character, as it is scanned, is recorded in a corresponding array in memory and the memory address for each scan coordinate is then modified to correspond with the virtual character center. This coordinate center of the character is derived by inspection of the scanning array in parallel with the memory storing pass to determine the two adjacent all white rows and columns bounding the character. The coordinate center is then calculated by dividing the bounded row and column increment by two. The recognition of the character pattern is then performed by a set of Boolean discriminants selected to achieve the highest probability of in - character hits against a lowest probability of misses. Print fidelity, quantum misregistration and other character edge noise are filtered by selective OR-ing of test points along an axis having the highest incidence of noise.

12 Claims, 14 Drawing Figures

OPTICAL CHARACTER RECOGNITION SYSTEM

BACKGROUND OF THE INVENTION

1. Field of the Invention

The present invention relates to optical character recognition systems, and more particularly to facsimile communication systems which further include character recognition logic for interpreting typewritten text and reducing such to standard code.

2. Description of the Prior Art

Transmission of a facsimile signal is most often done by way of telephone lines and therefore in addition to the cost of the equipment must bear the pro-rated cost of any long distance communication. In order to reduce the cost of the communication network used, various compression techniques were devised in the past for compressing the facsimile data to the minimal amount of data necessary to convey a graphical image. Typically such compression was performed by way of compressing either the run lengths of the redundancy of black and white scan signals without regard to the particular character symbol which has been scanned. Concurrent with this development there were other parallel developments wherein optical character recognition systems were provided for use in automatic reading as an input to digital computers. While there are still many areas of possible improvement in the amount of compression that can take place in straightforward facsimile communication, the major areas of redundancy have been covered and most breakthroughs occurring how have less time than a major on the total communication time. Since most documents transmitted in facsimile comprise typewritten text, character recognition appears to offer great promise in reducing transmission time. Thus, the most positive way of increasing communication speed appears to reside in encoding, or compressing by way of optical character recognition. This last approach has additional benefits when applied to facsimile systems since in the event that certain portions of the document cannot be recognized in the system can revert to a straightforward facsimile mode. Since character recognition is thus backed up by the facsimile mode the recognition system does not require absolute accuracy.

In most applications printed text comprises the most significant content of the bulk of facsimile transmission. Printed text, however, has never been well standardized and there are presently various accepted type fonts used for depicting the characters. By prior work type fonts like the OCR-B font were developed, however, because of a persisting lack of universal acceptance, recognition of other fonts is still desired and any automated recognition system should be amenable to easy modification to accommodate some of the other prevailing fonts.

Superposed over the problem of various type fonts is the variable fidelity of each particular printing machine or typewriter with which a particular type font is inscribed. For example, where printed matter is generated by a conventional typewriter, there exists over and above the variations in the font style the variation due to manufacturing tolerances of the font character itself, ribbon ink accumulation in the spaces within the character, the quality of the paper, dust or existing marking on the paper and the fidelity with which the character is transferred onto the paper. These latter variations are often referred to as "print quality".

Most prior art character recognition systems utilize what is in effect a character template, such templates being formed by digital code, and when a particular digitized scan of the character matches the template a character recognition is indicated. This template approach, however, requires extensive data point testing and furthermore lacks the desired flexibility to accommodate the above-described problems of print quality. For that reason various statistical correlation techniques have been attempted in the past for effecting an enhancement of the signal-to-noise features of the character itself. Further work in such template correlation has led to the conclusion that many characters, if not all the characters, in any alphabet, printed in all of the major fonts presently in use do not require a full template reading in order to obtain a match. Specifically, it has been found that only certain areas of a character need be positively identified in order to arrive at a conclusion as to the identity of the character.

Identification of such selected recognition features described above is typically performed in terms of the basic black-white distinction of a facsimile system. Since a facsimile system is normally limited in resolution by both the scanning raster and the digitized increments along the scan, commonly referred to as picture cells or "pixels", the alignment of the scanning raster or pixels relative the character introduces another source of error. This is commonly referred to as the "registration error".

Most prior art systems using such above-described pattern recognition techniques, in order to avoid such registration error, selected character pattern segments well centered within the character envelope as the character indices for identification. This immediately produced an additional problem in that certain smaller areas which distinguish similarly appearing characters are lost by way of these pattern recognition techniques. For example, the detail between the numeral 1 and the alphabetic symbol "I" appears most often in the upper right hand corner of the character I as a small projection. Loss of this data by use of only well-centered character identification points leads to confusion between the numeric 1 and the alphabetic I. Similarly, the numeral 2 can be easily confused with the letter "Z" since in certain type fonts only the upper right hand curvature of 2 distinguishes such from the letter Z. Again, this segment of the character in many type fonts, appears as a thin segment and therefore either the scanning raster density has to be increased or a confusing output has to be accepted.

Scanning raster or pixel density are normally a major cost item in any facsimile system, and furthermore typical scanning systems have already been devised with element density selected on the basis of character pitch and font height. Any character recognition system, in order to obtain best cost economics, should utilize such standardized scanners and is therefore limited to this detail density. Furthermore an increase in scanning density adds costs beyond those effected by standardization since both the data rate and volume have to increase.

SUMMARY OF THE INVENTION

Accordingly, it is the general purpose and object of the present invention to provide a logical system adapted for use with a facsimile device whereby printed characters are scanned and recognized and subsequently converted to some standardized character code for transmission or storage.

Further objects of the invention are to provide an optical character recognition system which, according to Boolean discriminants, identifies characters by inspecting only certain areas thereof.

Further objects of the invention are to provide a character recognition system which is insensitive to small errors in registration.

These and other objects are accomplished within the present invention by combining an optical recognition system of novel design with a facsimile image system. The facsimile system itself is generally conventional in the pick up details, including means for scanning in a particular raster a document or page selected for transmission, digitizing each scan into a fixed number of scan increments, and comparing each increment against a preselected threshold value to determine whether the reflectivity of the document area corresponding to this increment is black or white on the average.

Within the recognition segment, inventive structure is included which inspects a selected array of scanned data, comprising an $m \times n$ matrix of pixels for the location of a character. This is done by searching for two blank rows or columns separated by some black elements. When the presence of a character is thus detected, the bounded array is registered according to a central position between these intercharacter column white spaces and the interline row white spaces. In these registered coordinates certain black-white pixels are then selected and compared against a sequential list of character discriminants stored in a read only memory (ROM). Each character discriminant is a Boolean function which will produce a result of True or False in response to a particular pixel array. The functions are of the Sum of Products class and consist of the OR of one or more terms. Each term consists of several Boolean conditions which are "anded" together. These Boolean conditions are of three types; natural variables which require a pixel to be True (Black); complement variables which require a pixel to be False (White) and "OR" tests which require a set of three adjacent pixels (in either a vertical, horizontal or diagonal row) to contain at least one True member. These last allow the logic to be relatively insensitive to errors caused by edge noise or slight misregistration of the scanned character.

Thus the inventive character recognition system provides two modes of detected error. The first mode of error is when all Boolean character discriminants are evaluated for the scanned input image and no match is found and the second error mode occurring when more than one matchup occurs between the character under scan and the various character patterns stored in memory. On each detected fault occurrence the system may be instructed to revert to straight facsimile mode transmitting the character pixel by pixel.

Undetected errors occur when the pixel array presented is representative of a particular pattern (e.g. I) but the logic incorrectly identifies it as another pattern (e.g. 1). This class of error is commonly referred to as substitutional error.

DESCRIPTION OF THE SPECIFIC EMBODIMENT

While the following description sets down by way of one example the implementation of the optical character recognition system contemplated herein, such implementation is exemplary only. It is to be noted that implementation by way of larger chips or integration at higher logic levels is within the skill of those in the art and no intent to limit the scope of the invention to these examples is therefore expressed.

GENERAL FUNCTION

Figure 1:
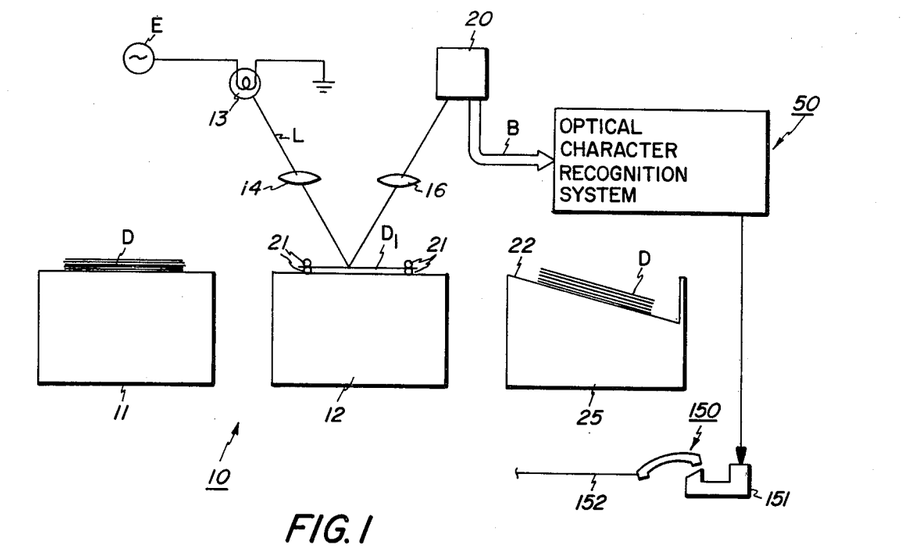
FIG. 1 is a diagrammatic illustration, in side view, of a scanning transport system useful with the present invention.

As shown in FIG. 1 the inventive OCR system generally designated by the numeral 50 is tied to a conventional scanner transport system 10 comprising a feed mechanism 11 supporting a stack of documents D of which one document $D_1$ is shown translated onto a scanner assembly 12. Disposed over the document $D_1$ is a source of light 13 excited by an electrical source E to direct a beam of light L through a cylindrical lens 14 onto the surface of the document $D_1$. The light L is then reflected through yet another cylindrical lens 16 to a photodiode array 20 which then applies a signal branch B to the inventive and presently disclosed optical character recognition system 50. At the completion of a full document scan the document $D_1$ is then translated by a plurality of opposed rollers 21 to a receiving bin 22 formed on the upper surface of a stacking mechanism 25. Connected to the output of the system 50 is a communication device 150 which through a coupler 151 ties to a telephone network 152 or directly to a computer or other data collection device. (Not Shown)

In this configuration the transport implementation is quite conventional and can be found described in more detail in the users and shop manuals of the Input Business Machines, Inc. model RIT 200 paper transport. Accordingly the description above is limited to the most basic elements necessary for the disclosure herein and further reference should be had to the above documents for details of physical implementation.

The above mentioned photodiode array 20 is implemented as a linear array of sensors sold by the Reticon Company under the model number RL32. An array of this kind includes a plurality of side-by-side photoreceptors with clocking and self-scanning features arranged to produce an approximate scan resolution of a 0.005 inches square aperture for each photoreceptor. The implementation of the photodiode array 20 is, furthermore, such that for the areas where the average subjacent aperture reflectivity of document $D_1$ is below a certain threshold, i.e., is black, the logical output of the photocell is a binary high or plus one (+1), while if the paper is white in the same aperture the logic level is low or zero (0).

Figure 2:
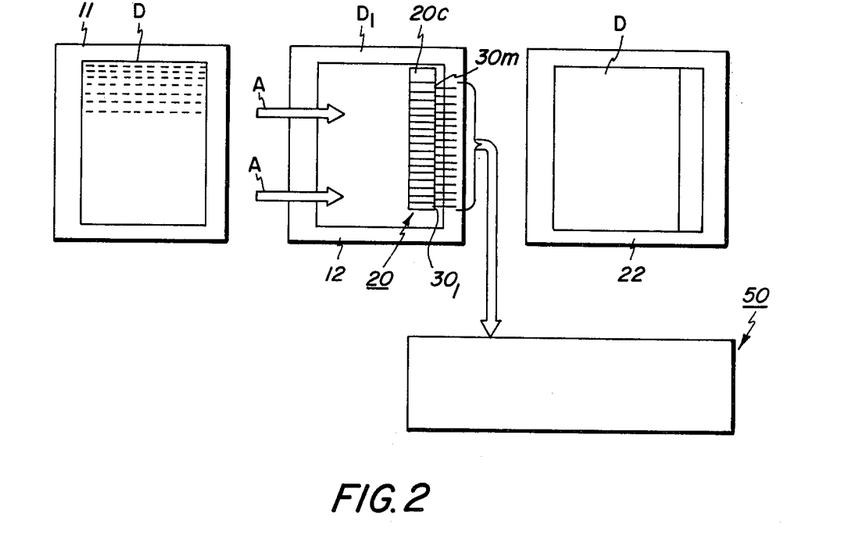
FIG. 2 is a top view of the system shown in FIG. 1.

This same implementation is shown in top view in FIG. 2, it being understood that the implementation herein is exemplary and other means of advancing and scanning a document can be used with the presently described system. In FIG. 2 the same documents from the top of stack D are translated along arrows A onto the face of the scanner assembly 12 where the photodiode array 20 is shown as a linear array aligned transversely to the direction of the arrows and having a plurality of photocells $30_1$–$30_m$. Thus as the document $D_1$ is advanced by rollers 21 each clock cycle increments this array 20 which will therefore assume a new binary code wherein bit positions 1 through n assume the new binary value according to the now subjacent reflectivity of the document. This binary code, shown as the parallel signal branch B, is applied to the inventive optical character recognition system 50 and therefore increment by increment provides to the system a digitally quantized black and white image of a portion of the document $D_1$.

Figure 3:
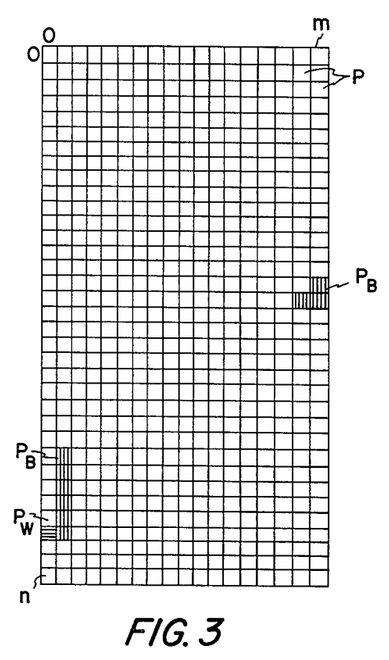
FIG. 3 is a scanning array of an unreferenced document image developed according to the present invention.

By selection of a sufficiently wide scanning array 20 (m bits wide) and a scan cycle count of n cycles an $m \times n$ array can be utilized in the system herein. One such array is shown in FIG. 3. For convenience in nomenclature each distinct aperture will be referred herein as a picture cell or pixel P comprising horizontally one scan cycle period developed by a scanning clock $20_c$ in the self-scanning photodiode array 20 and vertically one lateral dimension of a single photocell $30_1$–$30_m$. In this illustration there are shown a plurality of pixels P some black and designated as $P_B$ ans some white $P_W$. It is to be noted that on a straight or unoptimized basis this $m \times n$ binary array is equal to $2^m \times ^n$ possible different code words or subsets. Furthermore the array coordinates are initially arbitrary relative the document with the result that a character will unintelligible portions of the adjacent characters may be within the mxn array. It is within this relatively large and arbitrarily referenced domain that the present invention resides, which by logically centering the character and selecting the most optimal subset of M × N elements or pixels P will produce character recognition to a high probability.

To achieve this recognition it is desired first to isolate and center a character and then to inspect a logically selected minimal number of pixels P within the character which according to their polarity will immediately provide an identification to a desired level of probabilty. Since any image is necessarily quantized by the number of pixels P or, the resolution of the scanner, only an approximation of the character edges is possible. By reference to FIG. 4 a character A is shown centered relative a coordinate center C in an array having M × N discrete pixels P. Within this array a plurality of test points designated as O are selected to verify whether the local pixels are white ($P_W$) and selected black test points illustrated as X verify the presence of black pixels ($P_B$). By way of a judicious selection of test points X and O it is possible to achieve a quick determination of the character A.

Figure 4:
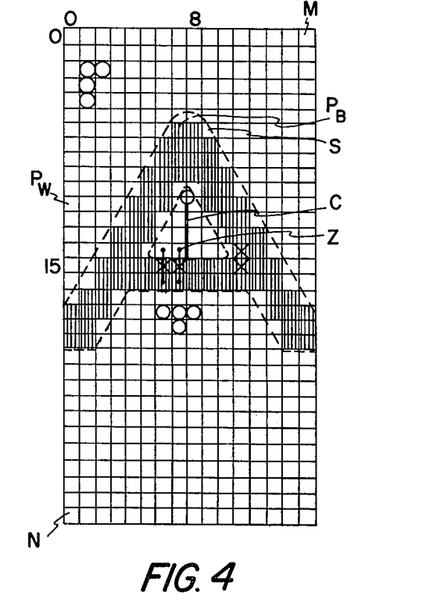
FIG. 4 is a bounded array of a referenced scanning image of one character developed according to the present invention.

First, however, it is required that the character be centered with respect to a coordinate center C since any misregistration errors, as for example a downward shift of the character, will immediately produce an erroneous reading on at least two of the exemplary X test points. As will be shown below this registration is achieved by starting at the top of the mxn array and finding the first row which is not all white and then starting at the bottom and finding the first row which is not all white and once having found such rows it is then concluded that the center of the character vertically resides halfway therebetween. Similarly in the horizontal direction the dimensions of the character are determined by examining for the first and last columns which are not all white.

As illustrated by the line S the edges of character A are only approximately described by the corresponding pixels $P_B$ as result of the scanner quantizing of pixels P into discrete black and white ($P_B$ and $P_W$) elements. Furthermore the pixel threshold in each instance will depend on the average reflectivity of the document $D_1$ aperture which also depends on the print fidelity of the edge. Thus the whole character A is quantized, and around its edges the pixel state depends both on the edge fidelity of the character and on registration. Thus both registration error and the effect of edge fidelity combine with a cumulative error which is accommodated by a logical OR arrangement to be described herein. Thus for example if the X test point at M = 8 and N = 15 is taken in an OR combination vertically as shown by the phantom coordinate Z the vertical effect of both edge fidelity and registration is conveniently taken out. In other instances illustrated both vertical and horizontal OR-ing can be made, or in fact, on a diagonal. In this manner any registration errors and edge noise or print quality are effectively taken out by simple OR logic with the only problem to be resolved by the system 50 being the registration and determination of the probability that these four X test points in combination with the 0 test points in the same frame represent a character A to a sufficient level of confidence.

THE REGISTRATION SYSTEM

Figure 5:
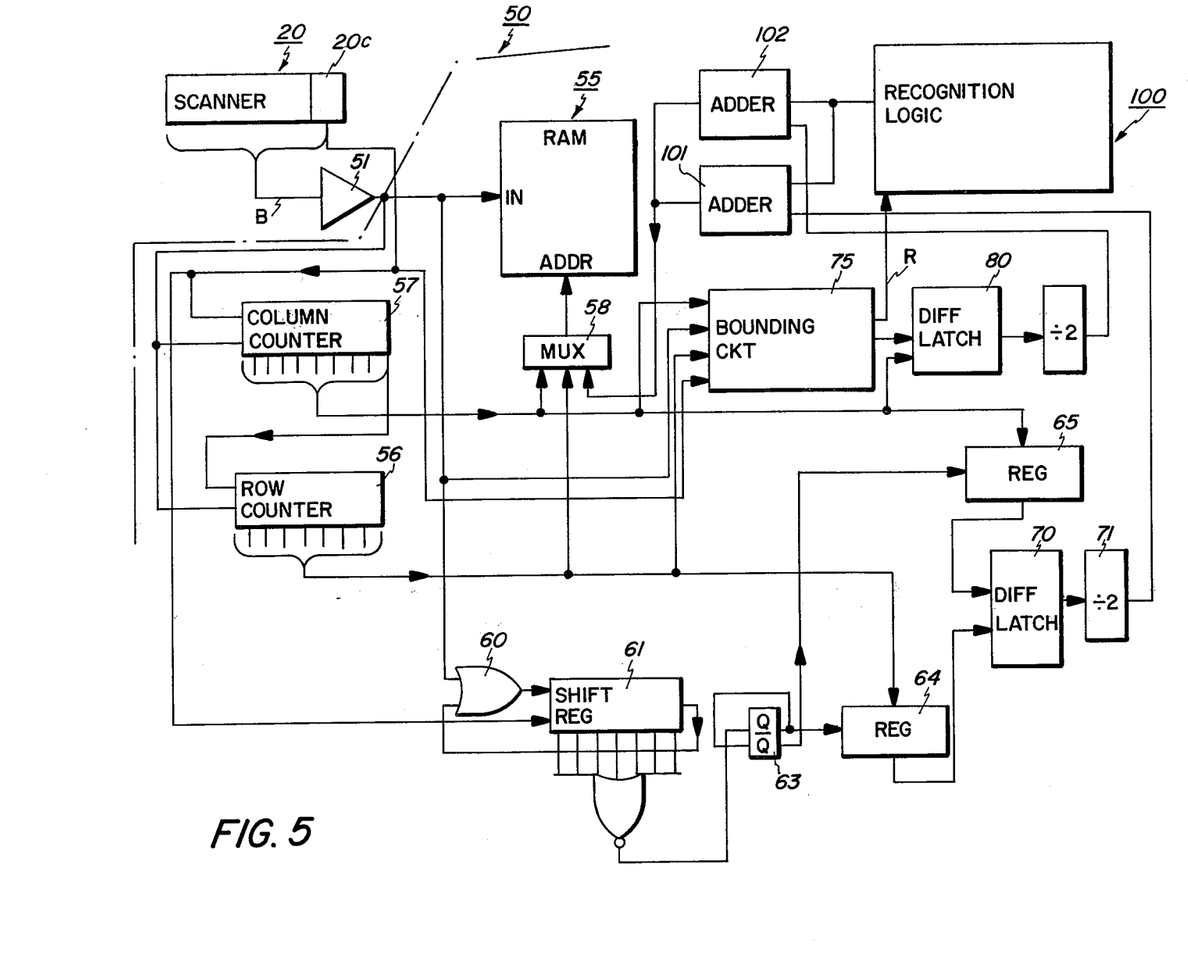
FIG. 5 is a generalized logic implementation constructed according to the present invention.

As shown in FIG. 5 scanner 20 provides a serial output B to a comparator 51 at a clock rate determined by a scanning clock $20_C$. The output of comparator 51, at the rate of clock $20_C$, then provides the input to system 50. More specifically, the output of comparator 51 is applied to the data IN terminal of a large random access memory (RAM) 55 at address location corresponding bit for bit to the scan coordinates of the document. The address coordinates are, in turn, developed by two raw address counters, i.e., a columm counter 57 which counts the sequential clock pulses from clock $20_C$ and which thus quantizes the document $D_1$ into discrete rows and a row counter 56 which counts up the most significant bit of counter 57. Counters 56 and 57 are collected as one address input to a multiplexer (MUX) 58 which provides the address input (ADDR) to the RAM 55.

In this configuration the contents of RAM 55 form the raw mxn array which is bit for bit and row for row in correspondence with the corresponding image on the document $D_1$. As shown in FIG. 3 an array size substantially larger than any one anticipated character is stored in RAM 55. Referring back to FIG. 5 any character within the array is unreference, being arbitrarily located according to the count from the row and the column counters 56 and 57 respectively. In order to discriminate the top and bottom limits of a character the white or blank rows separating two vertically adjacent characters or two lines of text are found. This is performed by further connecting the serial output of comparator 51 to one input of an OR gate 60 which at its output drives the serial input of a shift register 61. Register 61 is clocked by the same clock $20_C$ and thus advances in synchronism with the scanner 20. Shift register 61, furthermore, is conformed to contain a number of bits which is equal to the bit width of the scanner assembly 20. The serial output of shift register 61 is returned to the other input of gate 60 to form a recirculating loop through which the scanning sequence is vertically compressed. The parallel outputs of shift register 61 are collected at the input of a NOR gate 62 which drives a divide by two configured flipflop 63 every time all of the outputs of the shift register 61 are low. Flipflop 63 by its Q output strobes a top white count register 64 to enter into this register the concurrent contents of the row counter 56. The Q output of flipflop 63 in turn strobes yet another register 65 which stores the next successive blank row column count, again from counter 56. Registers 64 and 65, in turn, connect to a difference latch circuit 70 which subtracts the two counts and latches in the count difference. This count difference is then halved in a circuit 71 to provide the virtual row center offset in the RAM.

In a similar manner the horizontal bounds of the character are inspected for the character width. Unlike the row boundary circuit, however, the column limits require additional implementation. To accomplish this a generalized bounding circuit 75 combines the outputs of comparator 51, row counter 56, and column counter 57 with the clock $20_C$. In manner to be described, circuit 75 strobes in the corresponding column counts out of column counter 57 at which a full blank column appears for the first and second instance. This is strobed into yet another difference latch circuit 80 which again through dividing circuit 81 provides the horizontal virtual center of the character. An additional output R from circuit 75, occurring at the second instance of a blank column begins the character recognition cycle. Character recognition itself is performed by a circuit generally designated by the numeral 100 configured generally similar to the logic implementation of my prior application entitled "Programmed Device Controller", filed and appended herewith. Circuit 100 provides a sequential address output of test points which are combined with the outputs of circuits 71 and 81 in corresponding adders 101 and 102 to provide the center referenced address as an alternate input to multiplexer 58.

THE RECOGNITION ALGORITHM

Before proceeding with the description of the implementation details of the present system the technique developed for recognizing character patterns will now be set forth. Rather than applying a conventional template test the present invention utilizes Boolean discriminants in recognizing a character. More specifically after the character is centered a logical selection of test point coordinates is read out of the system 100 and each test point coordinate is then compared against the corresponding contents of RAM 55.

Figure 8:
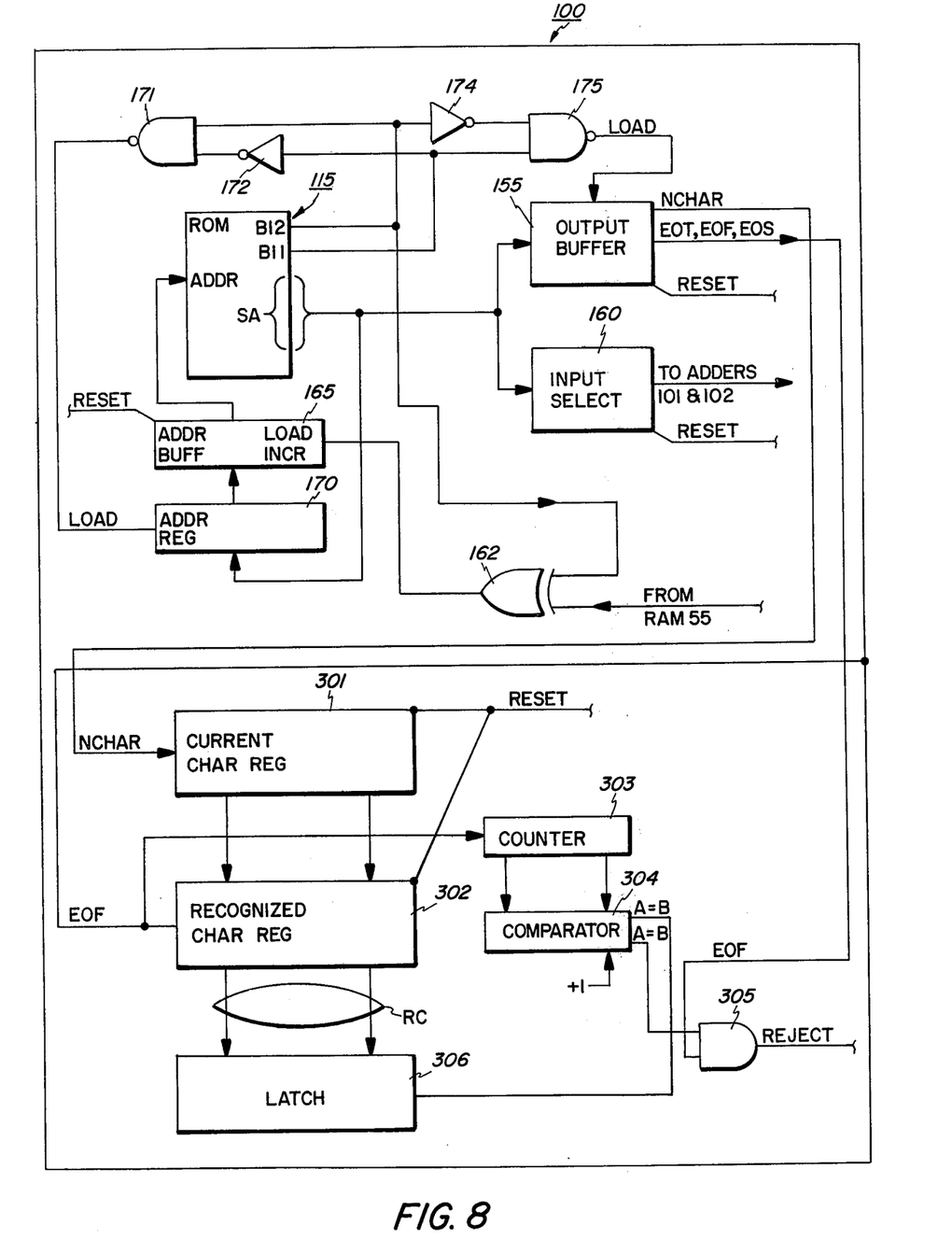
FIG. 8 is a detailed implementation of a character recognition subsystem useful with the present invention.

By reference to FIG. 8, these coordinates are stored by various fields of a ROM 115 together with associated bits in each field identifying the desired polarity or binary value of the test point. By way of this polarity field, the aforementioned True, False, and "OR" test points are set.

ROM 115 may contain, as an example, a complete list of test points necessary to identify characters of one or more fonts. One of the features of the present invention is the technique selecting such test points. These test points are used in a basic Boolean test to decide which character is being scanned. By statistical inspection of approximately 200–1000 renditions of the same font alphabet, a Boolean function for each category (character) in the font is designed according to an optimization algorithm. This algorithm can be set down by the following summary:

1. Find all test points which reduce the probability of a false hit in the particular character category, i.e., test points which reduce the probability that the function will respond True to incorrect characters;
2. Within the subset selected in Step 1 select only those test points which have a minimum probability of missing characters from the category for which the function is being designed;
3. Within the subset developed in Step 2 pick the test point having the minimum probability of a false hit;
4. Insert the variable selected into the function. If the probability of a false hit is zero, the term is complete. If the probability of a miss is also zero, the function is complete;
5. If the function is not complete, the "training data" is inspected and the probability estimates are modified and steps 1–4 are repeated until the function is complete.

The test points are then combined in the following function:

$$f_A = V_{11} \cdot V_{12} \cdot V_{13} \cdot (V_{14} + V_{15} + V_{16}) \cdots$$
$$\underbrace{\phantom{V_{11} \cdot V_{12} \cdot V_{13} \cdot (V_{14} + V_{15} + V_{16})}}_{\text{Term 1}}$$
$$+ V_{21} \cdot V_{22} \cdot V_{23} \cdots$$
$$- \text{Term 2} -$$

where Term 1 is complete whenever the next variable $V_{1,j+1}$ produces a probability of false hit = 0. Similarly the function, in this case including Term 2, is complete when the probability of miss = 0. The function therefore operates in two directions, one to isolate the character category from other confusingly similar categories and the second to pick from amongst those isolating test points a test point having the least chance of being a miss. The function $f_A$ furthermore is expanded to include the aforementioned OR combinatorial by way of test points $T_{14}$, $T_{15}$, and $T_{16}$ to accommodate edge and registration problems.

By way of this technique a set of test points X and O can be inscribed in ROM 115 which in the quickest sequence identify a character. An exemplary listing of the test points for an "o" is set forth below, concurrent reference being made to FIG. 6 where this character is graphically displayed in the M × N array (illustrated is the pixel pattern of an OCR-B, American version, character).

DEFINITIONS:
   Class 3=Vertical OR
   Class 2=Horizontal OR
   Class 1=Complement
   Class 0=Natural

| | | | | |
|---|---|---|---|---|
| V selected: | col=13, | row=15, class=3, | false hits=2846, | M=0 |
| V selected: | col=7, | row=21, class=2, | false hits=1036, | M=0 |
| V selected: | col=7, | row=16, class=1, | false hits=420, | M=0 |
| V selected: | col=6, | row=10, class=3, | false hits=178, | M=0 |
| V selected: | col=9, | row=15, class=1, | false hits=78, | M=0 |
| V selected: | col=6, | row=23, class=1, | false hits=15, | M=0 |
| V selected: | col=1, | row=21, class=1, | false hits=7, | M=0 |
| V selected: | col=7, | row=18, class=1, | false hits=3, | M=0 |
| V selected: | col=8, | row=7, class=1, | false hits=1, | M=0 |
| V selected: | col=1, | row=15, class=2, | false hits=0, | M=0 |

Where M=Miss.

Figure 6:
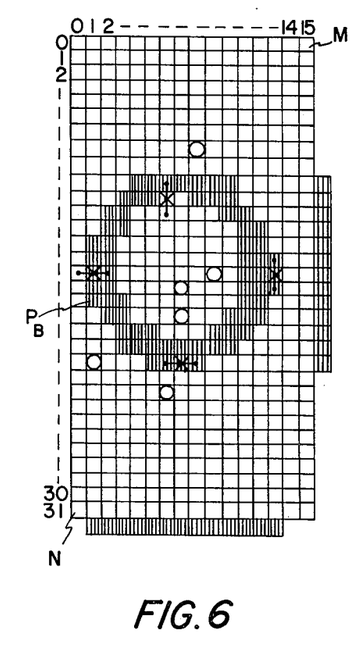
FIG. 6 is a character pattern of a character illustrating areas of highest discrimination.
Figure 9:
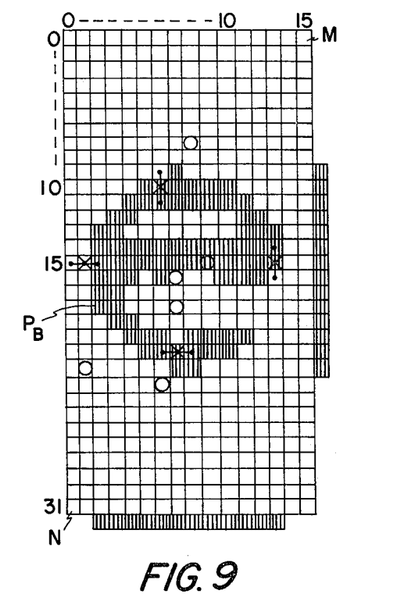
FIG. 9 is a character pixel pattern competing with the character shown in FIG. 6.

By reference to the above table, it is noted that each successive variable V is selected such that the number of false hits is minimized. In corresponding notation the test points X and O shown in FIG. 6 are selected for examination against the transformed elements of RAM 55 in the above sequence. Similarly, in FIG. 9, a competing character "e" is distinguishable by a single 0 test point at row 15 column 9. According to the table above this test occurs substantially above the end of test and therefore has substantially more utility than the above mentioned singular discrimination.

Figure 10:
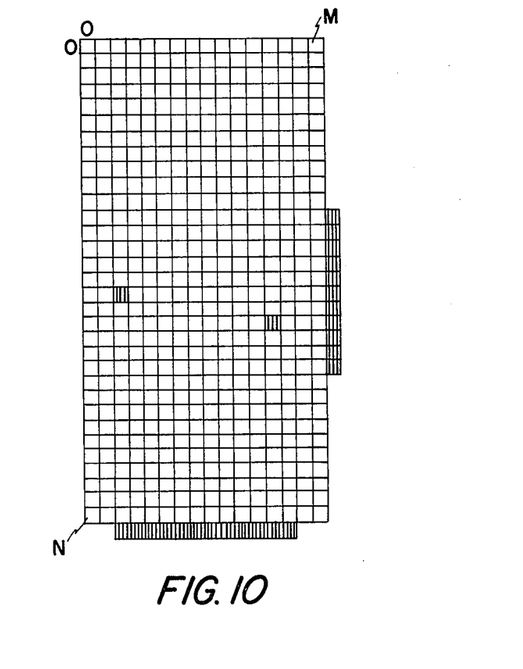
FIG. 10 is a character pixel pattern of an AND combinatorial of a statistical sampling of the variants of the character shown in FIG. 6.
Figure 11:
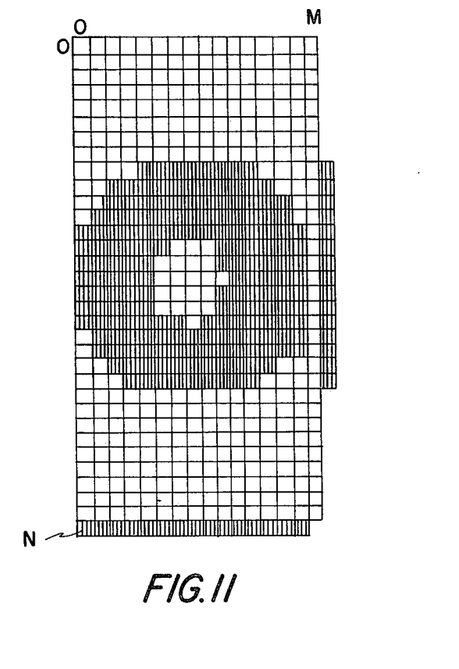
FIG. 11 is a character pixel pattern of an OR combinatorial of a statistical sampling of the variants of the character shown in FIG. 6.

To highlight the effectiveness of the present algorithm reference should be had to FIGS. 10 and 11. In FIG. 10 all tested noise variants of a single font "o" are combined in a logical OR. Similarly in FIG. 11 the same noise variants are combined in a logical AND. Most prior art systems of this kind either consider the logical OR (correlation) or AND (template). The present algorithm, in fact, does not even utilize one of the AND coordinates on the basis that such does not sufficiently improve the probability of false hits.

The arithmetic equivalent of this algorithm can be stated as follows:

$$DNFH/_{DNGH} \Rightarrow MAX\ NEGATIVE$$

and $$P\ MISS \Rightarrow O$$

where DNFH is the change in the number of false hits and DNGH is the change in the number of good hits for each new variable V.

Figure 12:
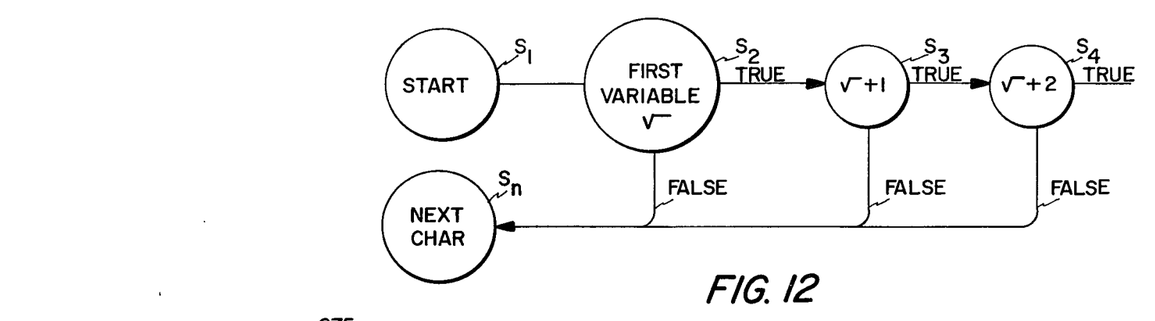
FIG. 12 is a state diagram useful with the present invention.

This algorithm, while parallel in form, may be sequentially implemented to optimize processing time. In this implementation a test sequence is established according to the state diagram illustrated in FIG. 12. As shown in this figure the first step $S_1$ starts with the first character in a font and proceeds to test in the second step $S_2$ on the first varible V. If the test fails the sequence is advanced immediately to a new character shown as step $S_n$. Similarly all other tests ($S_3$ and $S_4$) branch to step $S_n$ on a failure. Thus in minimal hardward a sequence is stepped through which eventually either finds a recognized character, or fails.

Figure 7:
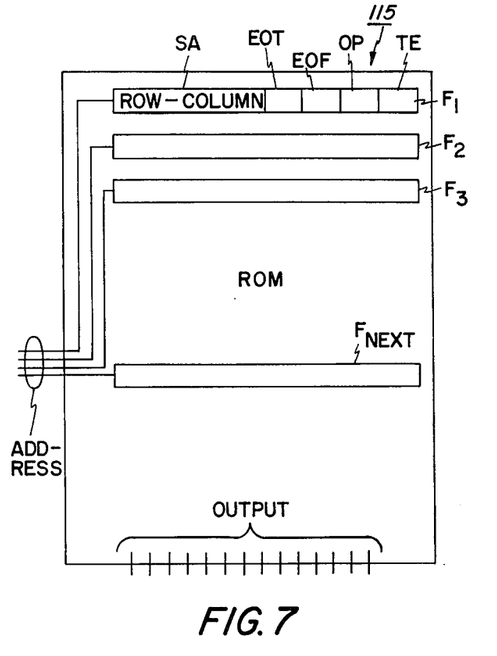
FIG. 7 is a memory field arrangement useful with the present invention.

As shown in FIG. 7, ROM 115 is broken down into various fields, each field being uniquely addressable according to conventional techniques. Thus as an example if one test is successful the address is incremented to the next field which includes an address pointer to the next test point coordinate to be tested. If the test fails initial address, the next address beings the inspection of a successive character. This is illustrated in terms of fields $F_1, F_2, \ldots F_{next}$ each uniquely selected by the input address and each developing an output. Within each Field $F_1, F_2 \ldots$ there is therefore a segment SA which includes the row and column coordinates, in binary code, of the test variable V shown above in decimal form. The last two bits, shown as bits OP (operation) and TE (test) accommodate the four class states described above.

Thus ROM 115 contains words of two types: "address next" words and logic encoding words. The address next word occurs at the beginning of each new term and points to the next new term (which may be a term of the same logic function or the first term of the next logic function). It contains also two status bits EOT and EOF. If EOT is true that means that the term is the last term of the entire logic set and if it fails, the test is complete. If EOF is true that means that the next term begins the next function.

The logic encoding words contain the information necessary to measure the status of the Boolean variables required by the various terms of the various functions. The fields contained are: Row, Column, Type, EOT and EOF.

The above representation may be replace by a more general device described in my prior application for a "Programmed Device Controller" filed a copy thereof being appended to this application as Appendix A. Refernce therefore should be had to this appendix for more extensive description of the logical sequence now utilized.

IMPLEMENTATION OF THE RECOGNITION LOGIC

The foregoing exemplary state diagram is implemented in the above referenced ROM 115 which, in one embodiment shown in FIG. 8 is incorporated in a circuit similar to that shown in my prior application "Programmed Device Controller" appended herewith.

Thus the recognition logic 100 comprises ROM 115 which provides n bits of output, a section of which shown as segment SA forming the address inputs added to the center coordinate in adders 101 and 102. The remaining two bits form the instruction code according to my prior application.

To illustrate the recognition logic a simplified implementation of my prior system is utilized herein. More specifically ROM 115 provides n bits of output of which the bit field identified SA is connected to an output buffer 155, an input select buffer 160 and an address register 170. Two bits $B_{11}$ and $B_{12}$ accommodate the instruction code, previously identified as class. In a manner similar to that disclosed in my appended application bits $B_{11}$ and $B_{12}$, through corresponding inverters 172 and 174, are collected at complementing NAND gates 171 and 175. Gate 171 controls the loading of register 170 while gate 175 controls the output buffer 155. The address field SA thus gets loaded either to produce an output or as a next address instruction. Register 170, in turn, connects through an address buffer 165 to the address inputs of ROM 115. Buffer 165 either increments or loads according to the polarity of an exclusive OR gate 162 which, at its input, collects the bit corresponding to the pixel in RAM 55 and the $B_{12}$ bit. Thus if bits $B_{12}$ and the pixel bit are the same a new address is loaded into buffer 165. Otherwise the address buffer increments.

The selection of the bit coordinates is performed by an input select buffer 160 which provides the row and column coordinates to adders 101 and 102 to be transposed by the centering shift above described.

In this form the system may progress until an end of function (EOF) code is developed on the output buffer 155. This identifies character recognition. Since, however, it is sometimes possible to have two or more character identifications for one pixel image additional logic is included through which all of the characters are checked and a recognition is registered only if one character is identified.

This additional logic comprises a current character register 301 which receives a NCHAR input from buffer 155 identifying which character is now tested. The contents of this register are loaded, when an end of function EOF code is developed in the buffer 155, into a recognized character register 302.

Concurrently a counter 303 accumulates the successive EOF signals which are then compared in a comparator 304 to see if more than one recognition has occurred. If so, there are two competing characters and a reject is indicated at the output of an AND gate 305. If only one character is recognized a latch 306 is strobed to register the identification number of that character.

In the above sequence, the previously described OR test are accommodated by code. The following exemplary code sequence illustrates this function using a code on bits $B_{11}$ and $B_{12}$ set as:

| $B_{11}$ | $B_{12}$ | |
|---|---|---|
| 0 | 0 | = Horizontal OR |
| 0 | 1 | = Vertical OR |
| 1 | 0 | = Natural |
| 1 | 1 | = Complement |

CODE SEQUENCE

Bit Left 1 = INPUT  0 = OUT
Next ⇒   Input = State
         Output ⇒ Next = 1
         Load Adr ⇒ Next = 0

| Loc. | Contents | (Continued) |
|---|---|---|
| 0 | LOAD ADR | 0 0 0 0 1 1 0 |
| 1 | INTBT | 0 0 1 1 1 0 1 0 0 |
| 2 | INTBT | 0 0 1 1 0 0 1 0 0 |
| 3 | INTBT | 0 1 0 0 0 0 1 0 0 |
|   |   | Next Term |
| 4 | LOAD ADR |  |
| 5 | INTBT | 1 1 1 1 1 1 1 1 1 |
|   |   | Next Term |
| 6 | LOAD ADR |  |
| 7 | INTBT | 0 1 0 1 1 1 1 0 0 |
| 8 | INTBT | 0 1 1 0 0 1 0 1 1 |
| . |  |  |
| . |  |  |
| . |  |  |
| n | LOAD ADR | "Next Fail" |
| n+1 | INTBF | (23) (12) |
| n+2 | LOAD ADR | "Next Hit" (address) |

IMPLEMENTATION OF THE SYSTEM

Figure 13:
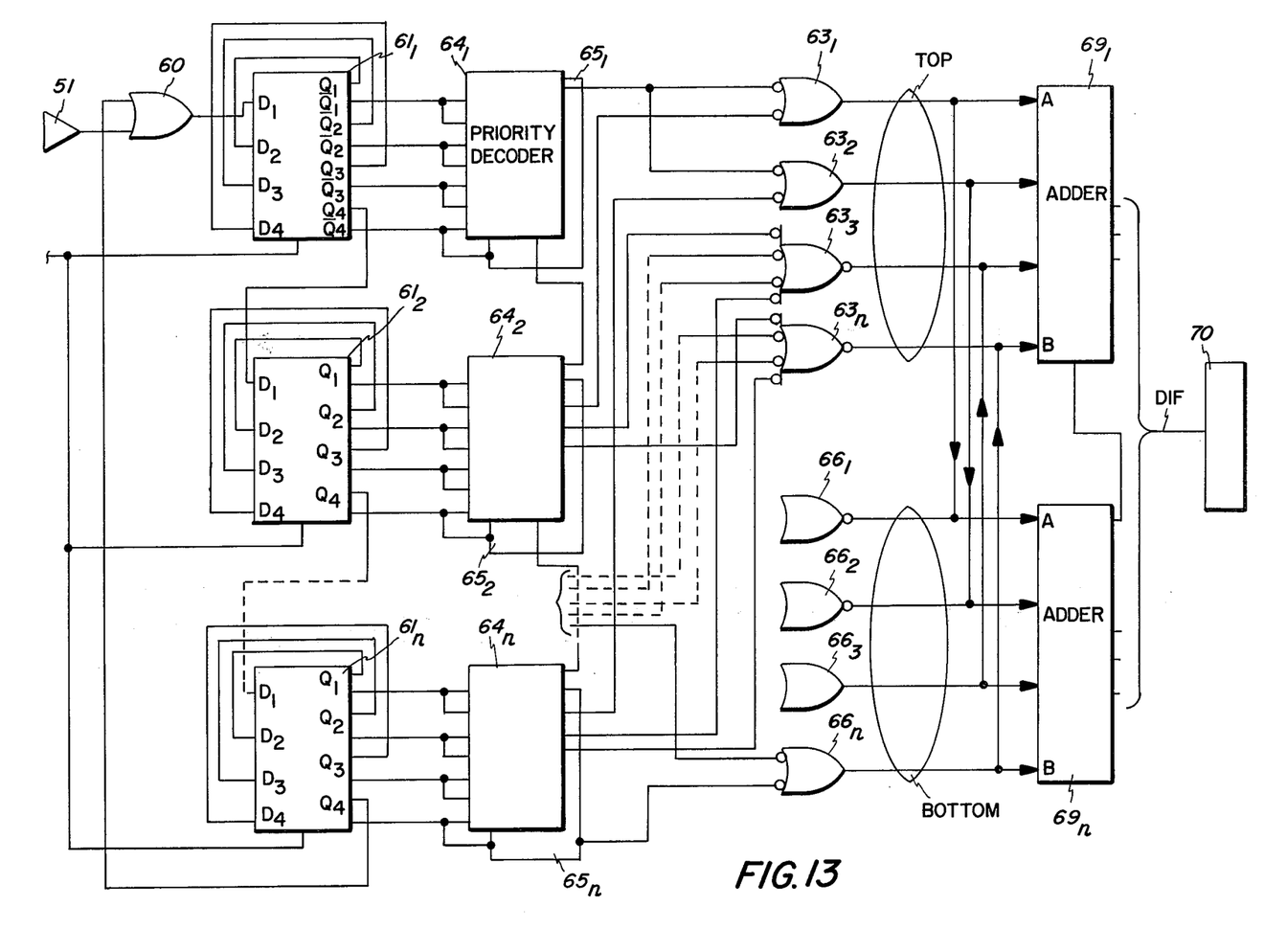
FIG. 13 is a detailed implementation of one logic section disclosed herein.

As shown in FIG. 13, and as previously disclosed, the output of Comparator 51 is connected to the OR gate 60. Gate 60, as its second input receives the serial output of a generalized shift register 61 which in this figure is shown as a plurality of quad D type flip-flop $61_1$–$61_n$ chips such as those made by Texas Instruments under the Model Number SN 74175. The Q output of each flip-flop are connected to the next D input in a cascade to thus form a shift register having a number of bits equal to one scan bit count of scanner 20. To synchronize this register configuration with the scanner each chip $61_1$–$61_n$ is also clocked by the scanning clock $20_c$. The respective Q outputs of chips $61_1$–$61_n$ are in turn applied to two parallel sets of 8 line-to-3 line priority encoders $64_{1-n}$ and $65_{1-n}$, such as the T.I. SN 74148 encoder, forming the aforementioned registers 64 and 65. In addition this dual arrangement of priority encoders provides the functional equivalent of flip-flop 63. The order of cascade connection and input ranking of encoders $64_{1-n}$ and $65_{1-n}$ is opposite so that encoders $64_{1-n}$ provide the top first black pixel count while encoders $65_{1-n}$ form the bottom count. The priority flag output of decoder $64_1$ is collected with the same output of encoder $64_2$ at the inverting inputs of an OR gate $63_1$ with a similar combination of outputs from encoders $64_2$ and $64_n$ being applied to another OR gate $63_2$. In addition a plurality of NOR gates $63_3$–$63_n$ collect the various code outputs. Gates $63_1$–$63_n$, a manner conventional in the art, form the binary code for the top black pixel count shown as signal branch TOP. In a similar configuration a plurality of OR and NOR gates $66_1$–$66_n$ in 1's complement, form a bottom count BOT. Branches TOP and BOT are then respectively applied to the A and B inputs of an adder assembly comprising a plurality of SN 74283 adders shown as adders $69_1$–$69_n$ connected in cascade which thus produce a difference count DIF to a SN 74174 latch $70_1$. This latch, in combination with the previous adders, forms the function of the difference latch 70. It is to be noted that in this arrangement the TOP and BOT designations are arbitrary and are referenced to the scanner count. The system therefore can arbitrarily oriented relative document $D_1$; the only necessary condition being that the column recognition logic described above be reference to the scan sequence.

In similar arrangement the search for a first and second blank row is implemented. The details of implementation, however, are somewhat different and for that reason reference should be had to FIG. 14 at this point. As shown in this figure the output of comparator 51 is applied to the J terminal of a J - K flip-flop 275 which is grounded at the K terminal. That same flip-flop is clocked by the clock $20_c$, inverted through an inverter 276, and therefore will go high on the next clock period after the first black pixel appears. Another flip-flop 277 is similarly connected. Flip-flop 275 is cleared on each new scan cycle by a signal SCAN and flip-flop 277 is cleared by the end of row increment signal ROW inverted by an inverter 181 and originating in the most significant bit portion of column counter 57. The Q output of flip-flop 275 and the $\bar{Q}$ output of flip-flop 277 are collected in an AND gate 278 to drive a D flip-flop 279 which is clocked once again by the ROW signal. The Q and $\bar{Q}$ outputs of flip-flop 279 drive respectively the chip enable terminals of two latching registers 285 and 286 which respectively latch in the current column counts from counter 57. The outputs of latches 285 and 286 then provide the A and B inputs to an adder 288, latch 286 being converted to complementary form by a generalized inverter 289. The output of adder 288 is then latched in latch 80. Signals SCAN and RESET are the switchover signals between memory read and write previously generalized as signal R.

Figure 14:
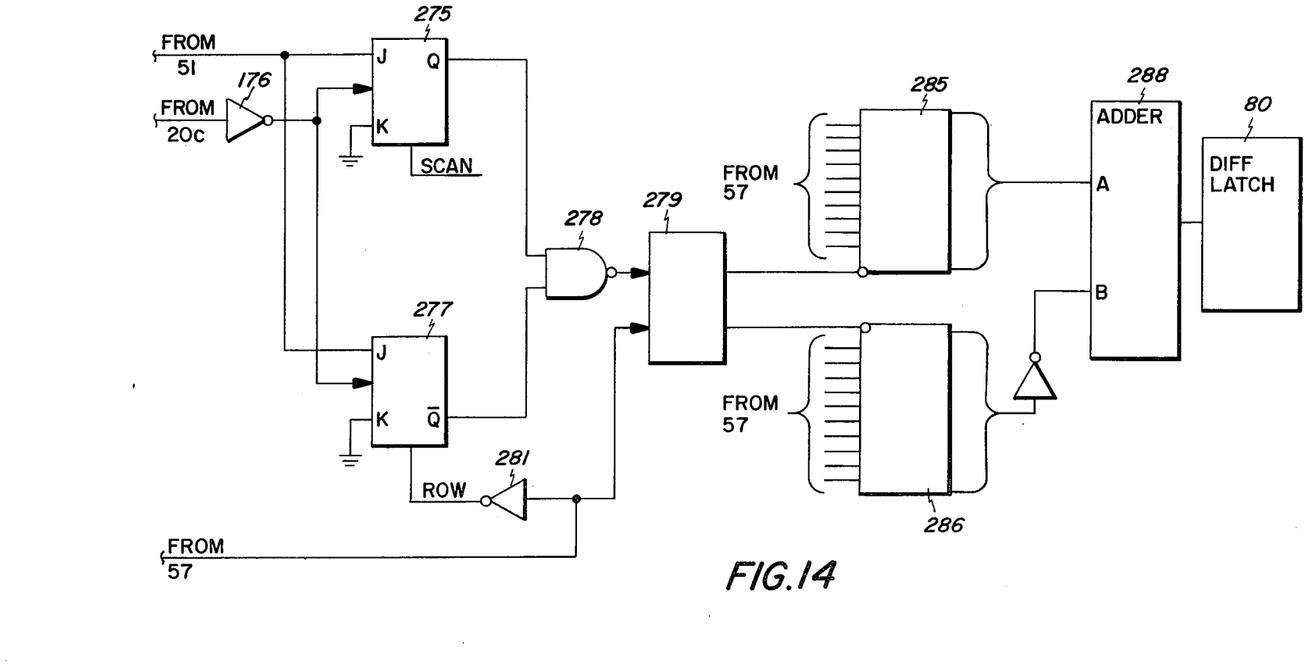
FIG. 14 is a detailed implementation of yet another logic section disclosed herein.

It is to be noted that the chip selection in FIG. 14 follows the selection logic of FIG. 13. Reference therefore should be had to the text appearing above for the various chip numbers.

Some of the many advantages of the present invention should now be readily apparent. The invention provides both for the centering of a character in a stream of text and a sequential test sequence for identifying this character. The sequential form of the identification test and the probabilistically optimized test points allow for very early exclusion of most characters and therefore reduce, on a statistical basis, the processing time in character recognition. This the invention provides in a system which is easy to produce, is mostly solid state and which therefore is reliable in use.

Obviously many modifications and variations to the above disclosure can be made without departing from the spirit of the invention. It is therefore intended that the scope of the invention be determined solely on the claims appended hereto.

I claim:

1. A character recognition system adapted for use with a facsimile scanner for sampling the reflectivity of a document medium comprising:
   memory means connected to said scanner for storing at corresponding address locations thereof the corresponding sampled reflectivity signals of said document medium;
   isolation means operatively connected to said scanner for isolating in the output thereof the coordinates of a character on said document medium; and
   pattern generating means connected to compare selected ones of said reflectivity signals in said memory means against a predetermined set of character patterns transposed by said character coordinates of said isolating means, said generating means including selected test points in said set of patterns combined in a logical OR to accommodate statistical variations in said isolated character.

2. Apparatus according to claim 1 wherein:
   said set of character patterns includes a plurality of subsets each corresponding to a particular alphanumeric character, the test points in each subset being selected to substantially maximize hits on one isolated character and to substantially minimize hits on all other characters.

3. Apparatus according to claim 2 wherein:
   said test points in one subset are compared sequentially against the contents of said memory means and on the first occurrence of a non-comparison the next subset is initiated.

4. A character recognition system for automatically recognizing alphanumeric characters on a document medium, comprising:
   document scanning means adapted to sense the elemental reflectivity of said document medium and producing a plurality of reflectivity signals indicative thereof;
   memory means connected to said scanning means for storing said reflectivity signals in a matrix corresponding to coordinate locations of said document medium;
   character isolation means connected to said scanning means for discriminating the vertical and horizontal boundary coordinates of a character on said document medium and storing a character center address corresponding thereto; and
   recognition means adapted to contain a plurality of test patterns corresponding to a set of alphanumeric characters and connected to said memory and isolating means for transposing said test patterns by said center address and comparing said transposed test pattern against corresponding reflectivity signals in said memory means.

5. Apparatus according to claim 4 wherein:
   said test pattern comprises a plurality of test point coordinates selected to produce a substantial maximum of hits on one character with a corresponding substantial minimum of hits on all other characters.

6. Apparatus according to claim 5 wherein:
   selected ones of said test points are combined according to a logical OR.

7. Apparatus according to claim 6 wherein:
   said scanning means includes serial sequencing means for arranging said reflectivity signals into a binary stream; and
   said isolation means includes serial inspection means connected to receive said binary stream for inspecting selected sections of said stream and producing a first and second horizontal and a first and second vertical set of bounding signals according to the absence of character reflectivity in said selected sections.

8. Apparatus according to claim 7 wherein:
   said test points of a test pattern are selected in sequence for transposition and comparison against a corresponding reflectivity signal as long as each comparison in successful.

9. In a pattern recognition system adapted for use in character recognition and including scanning means disposed for relative movement adjacent a document medium, said scanning means producing a serial stream of digital data indicative of the reflectivity of said medium at corresponding subjacent locations comprising:
   memory means operatively connected to receive said serial stream of digital data for recording thereof at corresponding addressable locations;
   address generating means operatively connected to said scanning means for producing a first address code in correspondence with said document medium;
   multiplexing means operatively connected to receive said first address code in a first state thereof and a second address code in a second state thereof for selecting said addressable locations in said memory means;
   boundary discriminating means operatively connected to receive said serial stream in parallel with said memory means for discriminating the vertical and horizontal boundries of a character on said document medium and recording the boundary coordinate thereof;
   recognition means adapted to contain selected pattern codes of a plurality of characters; and
   combining means connected to receive said pattern codes and said boundary coordinates for providing said second address coordinates according to a predetermined combination thereof.

10. Apparatus according to claim 9 wherein:
    said recognition means further includes comparison means for comparing said test patterns at said second address coordinates with a corresponding first address coordinate in said memory means.

11. Apparatus according to claim 10 wherein:
    said test points in each said test pattern are selected to substantially maximize hits on one character and to minimize hits on all other characters.

12. Apparatus according to claim 11 wherein:
    said test points of one test pattern are compared in sequence against said memory means.

* * * * *